United States Patent
MacLellan et al.

(10) Patent No.: US 6,185,418 B1
(45) Date of Patent: Feb. 6, 2001

(54) ADAPTIVE DIGITAL RADIO COMMUNICATION SYSTEM

(75) Inventors: John Austin MacLellan, Freehold; R. Anthony Shober, Red Bank; Gregory Alan Wright, Colts Neck, all of NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 08/966,266

(22) Filed: Nov. 7, 1997

(51) Int. Cl.[7] ....................................................... H04M 3/00
(52) U.S. Cl. ........................ 455/418; 455/425; 455/434; 455/553; 370/200
(58) Field of Search ................................. 455/418, 425, 455/67.1, 553, 575, 434, 426, 435; 370/200

(56) References Cited

U.S. PATENT DOCUMENTS

| 4,254,504 | 3/1981 | Lewis et al. ............................ 455/76 |
| 4,335,426 | 6/1982 | Maxwell et al. ...................... 364/200 |
| 4,525,865 | 7/1985 | Mears .................................... 455/186 |
| 4,843,588 | 6/1989 | Flynn .................................... 364/900 |
| 4,905,305 | 2/1990 | Garner et al. ......................... 455/183 |
| 4,926,497 | 5/1990 | Shirley, Jr. et al. ................... 455/67 |
| 4,984,295 | 1/1991 | Engstrom et al. .................... 455/186 |
| 5,019,910 | 5/1991 | Filmer ................................... 358/188 |
| 5,429,820 | 7/1995 | Okada et al. ........................ 455/38.3 |
| 5,485,505 | 1/1996 | Norman et al. ........................ 379/58 |
| 5,488,356 | 1/1996 | Martinovich et al. .......... 340/825.22 |
| 5,655,003 | 8/1997 | Erving et al. ......................... 379/418 |
| 5,657,487 | 8/1997 | Doner ................................... 455/456 |
| 5,946,634 * | 8/1999 | Korpela ................................ 455/552 |
| 5,960,335 * | 9/1999 | Umemoto et al. ................. 455/226.2 |

FOREIGN PATENT DOCUMENTS

| WO95/17077 | 6/1995 | (WO) .............................. H04Q/7/32 |
| WO97/48188 | 12/1997 | (WO) .............................. H04B/1/38 |

OTHER PUBLICATIONS

"Model of Digital Communications System", by John G. Proakis, *Digital Communications* Second Edition. pp. 64–67.

* cited by examiner

Primary Examiner—Daniel S. Hunter
Assistant Examiner—Darnell R. Armstrong
(74) Attorney, Agent, or Firm—Julio A. Garceran

(57) ABSTRACT

The present invention involves an adaptive digital radio communications architecture which can be reconfigured by reprogramming at least one programmable device, and thus more efficiently use the available bandwidth of a time-varying RF channel and/or to provide a flexible and adaptive digital communications system. In certain embodiments, the programmable device uses a Programmable Logic Device (PLD) to perform the digital communications processing functions of the transmitter or the receiver of a radio communications system. In this context, PLD is a general term representing a family of programmable logic devices; examples of this family are a Programmable Array Logic (PAL), a Complex PLD (CPLD), and a Field Programmable Gate Array (FPGA). The architecture is reconfigurable in the sense that any or all of the digital communications processing algorithms can be modified by reprogramming the PLD.

19 Claims, 4 Drawing Sheets

ADAPTIVE DIGITAL RADIO COMMUNICATION SYSTEM

FIELD OF THE INVENTION

The present invention relates to wireless communications systems and, more particularly, to a wireless communications system using adaptive reconfigurable communication techniques.

BACKGROUND OF THE INVENTION

Wireless communication systems are used for a variety of applications, such as identification, tracking, radar, data communications, voice communications, and video communications. In radio frequency (RF) digital radio systems, a terminal unit communicates with other terminal units using modulated radio signals. The terminal units include digital receivers which demodulate the incoming digitally modulated RF carrier to reproduce the data message being transmitted.

A software radio receiver system is a baseband receiver architecture and implementation in which all of the baseband receiver functions are performed digitally, typically utilizing a digital signal processor or a general purpose processor, in which the processor executes program instructions to perform the baseband processing functions. As such, software radio takes the received radio signal, typically after having been demodulated to an intermediate frequency (IF), and recovers the channel symbol bits. Current software radio technology is limited in terms of the channel symbol rates which can be digitally demodulated. A digital signal processor or general purpose processor is basically a serial computational device, thus limiting the processor's computational speed. Thus, wideband technology, such as code division multiple access (CDMA) systems with symbol rates near to or exceeding one megasymbol per second cannot currently be practically implemented in a traditional software radio approach. In summary, software radio techniques are limited due to the processing capabilities; they can either support narrowband technology, or must be coupled with other techniques in order to support wideband technology.

Current technology also supports multiple mode terminals. For example, cellular telephony supports dual or triple mode terminal units, where each mode communicates at a different frequency and utilizing a different protocol mode. As an example, a cellular telephone could support the analog advanced mobile phone system (AMPS) 30 kHz bandwidth air interface standard, and could also support a time division multiple access (TDMA) air interface standard based upon having multiple time slots within the same 30 kHz channel. However, in technology used to build dual-mode radio communication systems, the protocol mode is determined at call set-up time, and remains fixed for the duration of that call. Although some of the hardware can be reused between these modes, a dual-mode cellular telephone typically utilizes duplicative or redundant hardware, such as the RF and intermediate frequency (IF) filters, with the software digital receiver implementing the baseband or IF-to-baseband processing functions. As discussed above, software radios are limited to narrowband modulation processing (typically less than 100 ksamples/sec), with additional hardware needed to perform wideband modulation processing (typically greater than 100 ksamples/sec).

Beyond the current limitations of software radio technology, there are many impairments in the RF channel, such as shadowing due to the geographic terrain, Rayleigh fading due to the constructive and destructive addition of multipath signals, and interference from other radios, which disrupt the successful transfer of data between the terminal units and to reduce the throughput of the information being transferred. Additionally, these RF impairments are time varying. To overcome RF impairments, complex transmitter/receiver schemes and devices have been developed, such as convolutional coders and adaptive antenna arrays. These complex schemes are designed based upon the worst case RF impairments of the RF channel to achieve certain quality of service measures which can be measured by various parameters, such as bit error rate (BER), packet error rate and latency or delay in subsequently delivering information previously corrupted. These schemes reduce the information capacity of the communication system to counter the expected RF impairments. However, if an RF channel is in a relatively uncorrupted state and not suffering from any impairments, current schemes do not take advantage of the full information capacity of the available bandwidth because bandwidth is still being used to counter the RF impairments.

SUMMARY OF THE INVENTION

The present invention involves an adaptive digital radio communications architecture which can be reconfigured by reprogramming at least one programmable device, and thus more efficiently use the available bandwidth of a time-varying RF channel and/or to provide a flexible and adaptive digital communications system. In certain embodiments, the programmable device uses a Programmable Logic Device (PLD) to perform the digital communications processing functions of the transmitter or the receiver of a radio communications system. In this context, PLD is a general term representing a family of programmable logic devices; examples of this family are a Programmable Array Logic (PAL), a Complex PLD (CPLD), and a Field Programmable Gate Array (FPGA). The architecture is reconfigurable in the sense that any or all of the digital communications processing algorithms can be modified by reprogramming the PLD. The architecture of the digital communications system can be characterized by the following parameters; the channel symbol rate, the occupied bandwidth, the modulation technique, and the multiple access technique. A reconfiguration is a modification of the architecture of the digital communications system, and can occur by reprogramming the PLD through external control, for example in the event a radio communications base station wishes to change the radio architecture being used for a particular piece of radio spectrum. A reconfiguration can also occur, for example, by dynamically reprogramming the digital communications system depending upon time-varying radio channel conditions, such as the effect of the number of channel users, the offered load, quality of service measurements, or the characteristics of the desired application(s), including voice, data, video and/or tracking. Methods to measure the time varying radio channel conditions are disclosed, and further how those measurements can impact a reconfiguration. This invention discloses how the architecture for the digital communications system can be dynamically reprogrammed based upon current channel conditions and/or through external control.

BRIEF DESCRIPTION OF THE DRAWING

Other aspects and advantages of the present invention may become apparent upon reading the following detailed description and upon reference to the drawings in which.

DETAILED DESCRIPTION

An illustrative embodiment of the adaptive digital radio communications system according to the principles of the present invention is described below. Here we disclose how the architecture of an adaptive digital radio communications system can be dynamically reconfigured to provide increased flexibility and enhanced performance. A reconfiguration of the digital radio architecture involves reprogramming the digital communications processing functions of the radio communications system. A reconfiguration can occur based upon external control, for example if a base station desires to change the radio architecture being used for a particular piece of spectrum. A reconfiguration can also occur based upon current channel conditions, which includes the effect of the number of channel users, the offered load, signal quality measurements, and/or the characteristics of the desired application including voice, data, video or tracking. As such, the radio architecture can be dynamically modified. Each reconfiguration yields a particular radio architecture, which consists of a combination of the following parameters; the channel symbol rate, the occupied bandwidth, the modulation technique, and the multiple access technique. The channel symbol rate is the rate of transmission of the encoded information symbols. The occupied bandwidth is the bandwidth necessary to contain the information symbols. The modulation technique is the method used to modulate the information symbols onto a carrier. The multiple access technique is the protocol used for a particular endpoint to gain access to a particular "channel", where channel could be a block of spectrum, a time slot, a spreading code, etc.

In one embodiment of this invention, the digital communications processing functions of the digital radio system are implemented, all or in part, in at least one Programmable Logic Device (PLD). In this context, PLD is a general term representing a family of programmable logic devices; included in this family are a Programmable Array Logic (PAL), a Complex PLD (CPLD), and a Field Programmable Gate Array (FPGA). In another embodiment, the radio system uses FPGA technology. An FPGA, being an inherently parallel device, has the capability of implementing all digital communications processing functions since many of the functions proceed in parallel. By adapting to changing operating conditions, the digital communications architecture provides increased flexibility and enhanced performance under for a given set of operating conditions.

Figure 1:
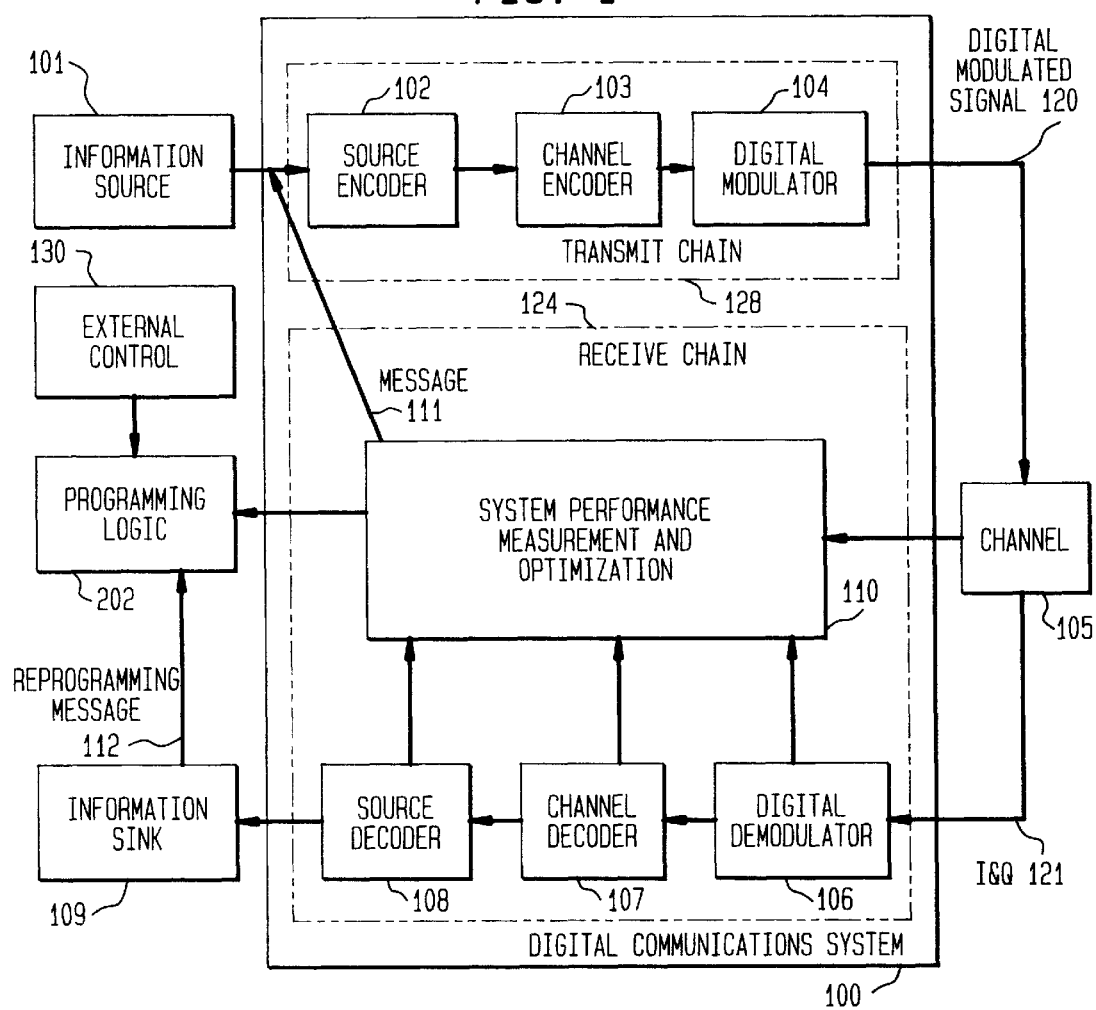
FIG. 1 shows a block diagram of a digital communications system.

FIG. 1 shows the basic block elements of a digital communications system. The objective of the Digital Communications System 100 is to deliver the information content of Information Source 101 to the Information Sink 109 through a given medium, the Channel 105. In certain embodiments, the information is in the form of digital signals which can originate from any type of source information including voice, data, video, tracking or random numbers. The information source is shown in FIG. 1 as the Information Source 101. The Information Source 101 sends its information to the Transmit Chain 128. Within the Transmit Chain 128, a Source Encoder 102 obtains the information signals and generates the actual information bits to be transmitted. A Channel Encoder 103 translates the information bits into channel symbols or channel encoded bits. The Channel Encoder 103 typically provides redundancy for error correction purposes. A Digital Modulator 104 translates the channel symbols or channel encoded bits into a digital modulated signal. The Digital Modulator 104 can use a variety of modulation schemes, such as amplitude, frequency, or phase modulation of any complexity; or a hybrid combination of amplitude, frequency and/or phase modulation. The Digital Modulated Signal 120 is then transmitted over the Channel 105.

In this embodiment, the Channel 105 consists of a radio communications channel. The Channel 105 includes circuitry to modulate the Digital Modulated Signal 120 onto an RF carrier, and to transmit the resulting modulated RF carrier over the radio communications channel. The radio channel will corrupt the Digital Modulated Signal 120; this is discussed further below. The channel medium could alternately be a fiber optic cable, a copper cable or an infrared wireless link. The Channel 105 then outputs the demodulated signal received over the radio channel. In one embodiment, this demodulation is performed using Heterodyne detection to an Intermediate Frequency (IF), and the output signal consists of two components of the demodulated signal, the In-Phase (I) and Quadrature (Q) elements, shown as I&Q 121.

In this embodiment, the I&Q 121 signals output from the Channel 105 are input to the Receiver Chain 124. Within the Receiver Chain 124, the Digital Demodulator 106 has as its inputs I&Q 121, and outputs the received channel symbols. A Channel Decoder 107 has as its input the channel symbols and decodes the channel symbols to produce the information bits. A Source Decoder 108 receives the information bits and decodes the information bits into the information signals. In theory, the received information signals that are transmitted from the Source Decoder 108 to the Information Sink 109 are the same symbols as transmitted from the Information Source 101 to the Source Encoder 102; however given the above mentioned corruption due to the radio channel, various techniques in the source and channel encoders and decoders are typically implemented. These coding techniques typically include convolutional and block coding and decoding, which provide redundant information by which corrupted data can be corrected.

In certain embodiments, a System Performance Measurement and Optimization (SPM&O) block 110 is located within the Receiver Chain 124. The SPM&O 110 monitors the performance of the Channel 105, the Digital Demodulator 106, the Channel Decoder 107, and Source Decoder 108, and determines which, if any, of the blocks 102–104 in the Transmit Chain 128 and blocks 106–108 in the Receive Chain 124 should be dynamically reprogrammed. Should a reprogramming become necessary, the SPM&O 110 instructs the Programming Logic 202 to reprogram the programmable device(s).

Figure 2:
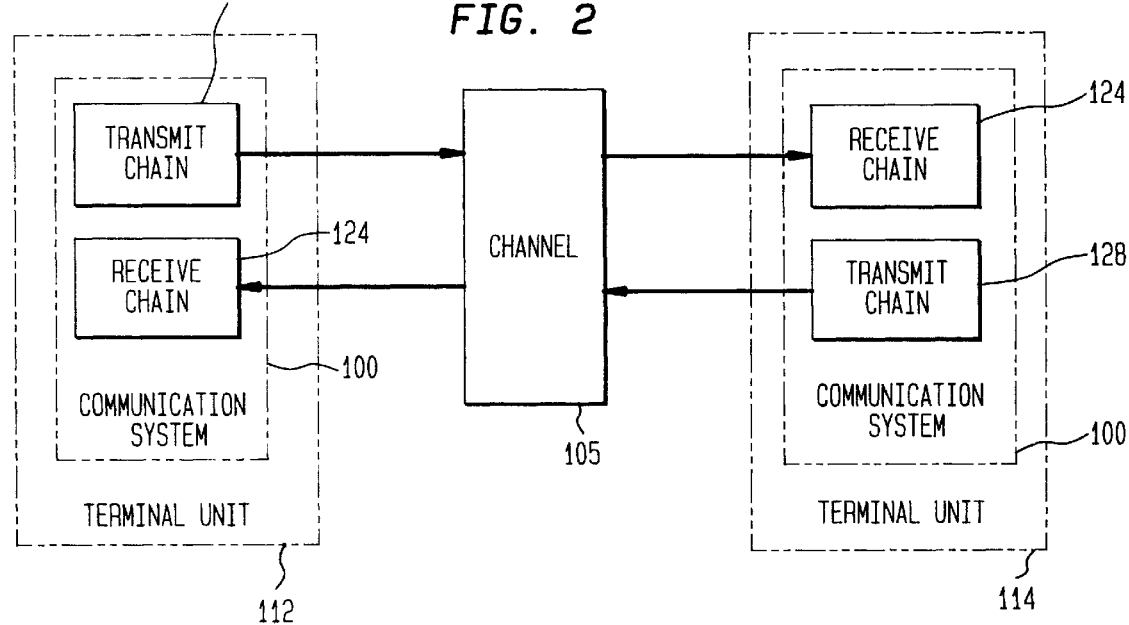
FIG. 2 shows a block diagram of two terminal units communicating over a channel using the digital communications system of FIG. 1.

Terminal Units 112 and 114 can be considered as two endpoints of a radio communications system. In one embodiment, the Terminal 112 could be a base station and the Terminal Unit 114 could be a mobile unit in a Cellular communications system. FIG. 2 shows the relationships between the Terminal Units 112 and 114, the Channel 105, the Communication System 100, the Transmit Chain 128, and the Receive Chain 124. Note that in the embodiment of FIG. 2, both Terminal Unit 112 and Terminal Unit 114 contain both Transmit Chain 128 and also Receive Chain 124. This configuration would be true for a bidirectional radio communications system.

In one embodiment, the SPM&O 110 determines, based upon the inputs shown in FIG. 1, that the radio communication system should be reconfigured to improve system performance between the Terminal Units 112 and 114. With joint reference to FIGS. 1 and 2, the SPM&O 110 provides a Message 111 to the Transmit Chain 128 of Terminal Unit 112, which is transmitted to the Receive Chain 124 of Terminal Unit 114. Upon delivery to the Information Sink 109 of Terminal Unit 114, the Message 111 becomes the Reprogramming Message 112. The Reprogramming Message 112 instructs the Programming Logic 202 to reconfigure the relevant blocks 102–104 and 106–108 (in the event that both Transmit Chain 128 and Receive Chain 124 are present within Terminal Unit 114). Then, within Terminal Unit 112, the SPM&O 110 instructs the Programming Logic 202 to reconfigure the relevant blocks 102–104 and 106–108 (in the event that both Transmit Chain 128 and Receive Chain 124 are present within Terminal Unit 112). As a result of the above steps, both Terminal Unit 112 and Terminal Unit 114 have been reconfigured in a manner that would improve the performance of the radio communication system. Note that the Message 111 can be transmitted over the Channel 105, over a different channel, or through an External Control 130 interface. As such, the Digital Communications System 100 according to the principles of the present invention enables pairs of Terminal Units 112 and 114 to dynamically adapt some or all of the blocks 102–104 and 106–108 (see FIG. 1) to a desired operating configuration. In certain situations, this allows the information throughput to be increased for a given channel state.

In certain embodiments, an External Control 130 can instruct the Programming Logic 202 to dynamically reconfigure some or all of the blocks 102–104 and 106–108 (see FIG. 1) to a desired operating configuration. An example of such a situation is if Terminal Unit 112 was a cellular base station, and a reconfiguration was desired to support a new radio communications protocol. The two radio communications protocols could be very similar in technical characteristics, or could be radically different with different channel symbol rates, bandwidths, and modulation techniques. An example of a radical change in radio communications protocols would involve a reconfiguration from a Time Division Multiple Access (TDMA) protocol to a Code Division Multiple Access (CDMA) protocol.

A reconfiguration of the radio communications protocol means that the technical characteristics or configuration of the Digital Communications System 100 (FIG. 1) has been changed or reconfigured. Such a reconfiguration results in changes in some or all of the following parameters: the channel symbol rate, the occupied bandwidth, the modulation technique, and the multiple access technique. In certain embodiments, reconfiguring a Transmit Chain 128 and Receive Chain 124 pair to change the radio communications protocol is implemented solely by dynamically reprogramming all or part of the Programmable Device(s) used to implement those chains.

The amount of signal degradation between the Digital Modulator 104 and the Digital Demodulator 106 depends on many varying channel conditions, e.g., multipath, signal fading, distance between Terminal Units 112 and 114, the number of co-channel/adjacent channel signals, etc. The signal degradation limits the signal-to-noise ratio (SNR) at the Digital Demodulator 106 which determines the average Bit Error Rate (BER) for a given digital modulation constellation and the available information bit rate of the digital communications system. One method to improve BER performance is to use a less bandwidth efficient digital modulation technique which requires less SNR per information bit; such as to move from Differential Quadrature Phase Shift Keying (DQPSK) to Differential Binary Phase Shift Keying (DBPSK) modulation. This can be accomplished by instructing the Programming Logic 202 to reprogram the Digital Modulator 104 and the Digital Demodulator 106.

In general, to lower the BER of the digital communications system for a given modulation constellation, redundancy is added to the source encoded bit stream by the Channel Encoder 103. The redundant information can detect and correct some of the bit errors output from the Digital Demodulator 106 by the Channel Decoder 107. However, for a fixed channel symbol rate, the information bit rate from the Source Encoder 102 must be lowered in order to include the redundant bits from the Channel Encoder 103. If the channel state is such that the Channel Encoder 103 bits are not necessary, then information throughput is sacrificed. Conversely, if the amount of channel encoding is not enough to overcome an undesirable channel state then information throughput will suffer.

Figure 3:
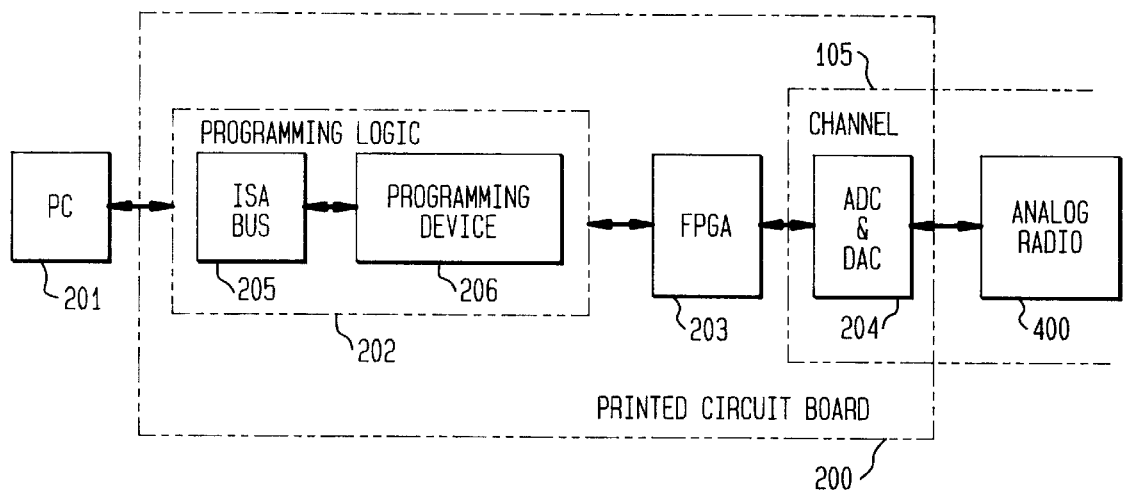
FIG. 3 shows a block diagram of one embodiment of an adaptive digital communications system.

FIG. 3 shows one embodiment for implementing a fully programmable adaptive digital communications radio transceiver using FPGA technology. In this particular embodiment, the system consists of three integrated circuit (IC) chips; which illustratively could be connected on a Printed Circuit Board 200. In this particular embodiment, FPGA 203 implements a transceiver including elements 102–104 described for the Transmit Chain 128 of FIG. 1 and the blocks 106–108 described for the Receive Chain 124 of FIG. 1. Additionally, in this particular embodiment, the FPGA 203 can also implement all portions of the SPM&O 110 (FIG. 1) of the Receive Chain 124 (FIG. 1). The Programming Device 206 within the Programming Logic 202 is used to reprogram the FPGA 203. The ADC & DAC 204, together with the Analog Radio 400, are logically part of, but not all of, the Channel 105 (FIG. 3).

In this particular embodiment, a personal computer (PC) 201 or other processing device stores the firmware—the code which is loaded into the FPGA—for the blocks 106–108 of the Receive Chain 124 (FIG. 1) and the blocks 102–104 of the Transmit Chain 128 (FIG. 1). The PC 201 communicates with the FPGA 203 through the Programming Device 206 located within the Programming Logic 202. The Programming Device 206 in this embodiment contains the necessary circuitry and associated I/O ports to communicate with the PC 201 through an ISA Bus 205 interface, and provides the interface circuitry to reprogram the FPGA 203 with new firmware. In an alternative embodiment, the Programming Device 206 is a microcontroller. In another alternative embodiment, a digital storage device (e.g., ROM, RAM) containing the block element firmware is directly connected to the FPGA 203. Other embodiments with different hardware configurations to reprogram the FPGA 203 are possible without deviating from the spirit of the present invention.

Figure 4:
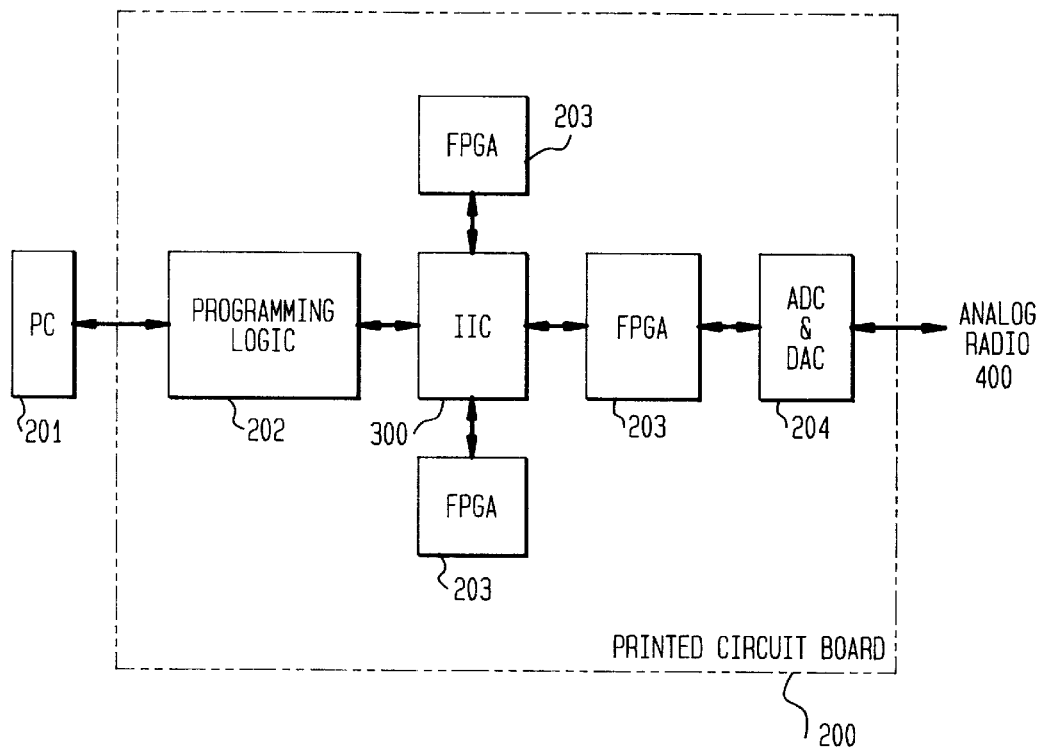
FIG. 4 shows a block diagram of an embodiment of an adaptive digital communications system using multiple FPGA devices connected by an Interconnection Integrated Circuit device.

As shown in FIG. 4, multiple FPGA devices 203 can be used to implement all the necessary digital communications functions if a single FPGA 203 (FIG. 2) does not have the necessary number of gates to implement the adaptive digital communications system. The multiple FPGA devices 203 can be hardwired by traces on the Printed Circuit Board 200 or more flexibly by one or more Interconnection Integrated Circuit (IIC). An IIC 300 is an IC chip device where the routing between input pins and output pins are determined by downloading firmware. Using the IIC 300 to interconnect multiple FPGA 203 devices allows the partitioning of digital communications system functionality between FPGA devices while maintaining flexibility of the digital communications system architecture. Therefore, the complexity of the system is not limited by the size of available FPGA devices.

With particular reference to FIGS. 3 and 4, the FPGA 203 communicates with an Analog Radio 400 through an Analog-to-Digital Converter (ADC) and Digital-to-Analog Converter (DAC) 204. ADC/DAC 204 in this embodiment contains two separate IC chips, one ADC and one DAC, both being dual I&Q channel converters. Other embodiments could combine all ADC/DAC functions onto a single IC or replace the ADC/DAC unit 204 with hard limiting devices. In the hard limiting embodiment, the output of the digital transmitter hardware within the ADC/DAC 204, using digital logic voltages for logical 1 and logical 0, are voltage level shifted and connected to the Modulation Mixer 406 (FIG. 5) to directly modulate the RF carrier.

Figure 5:
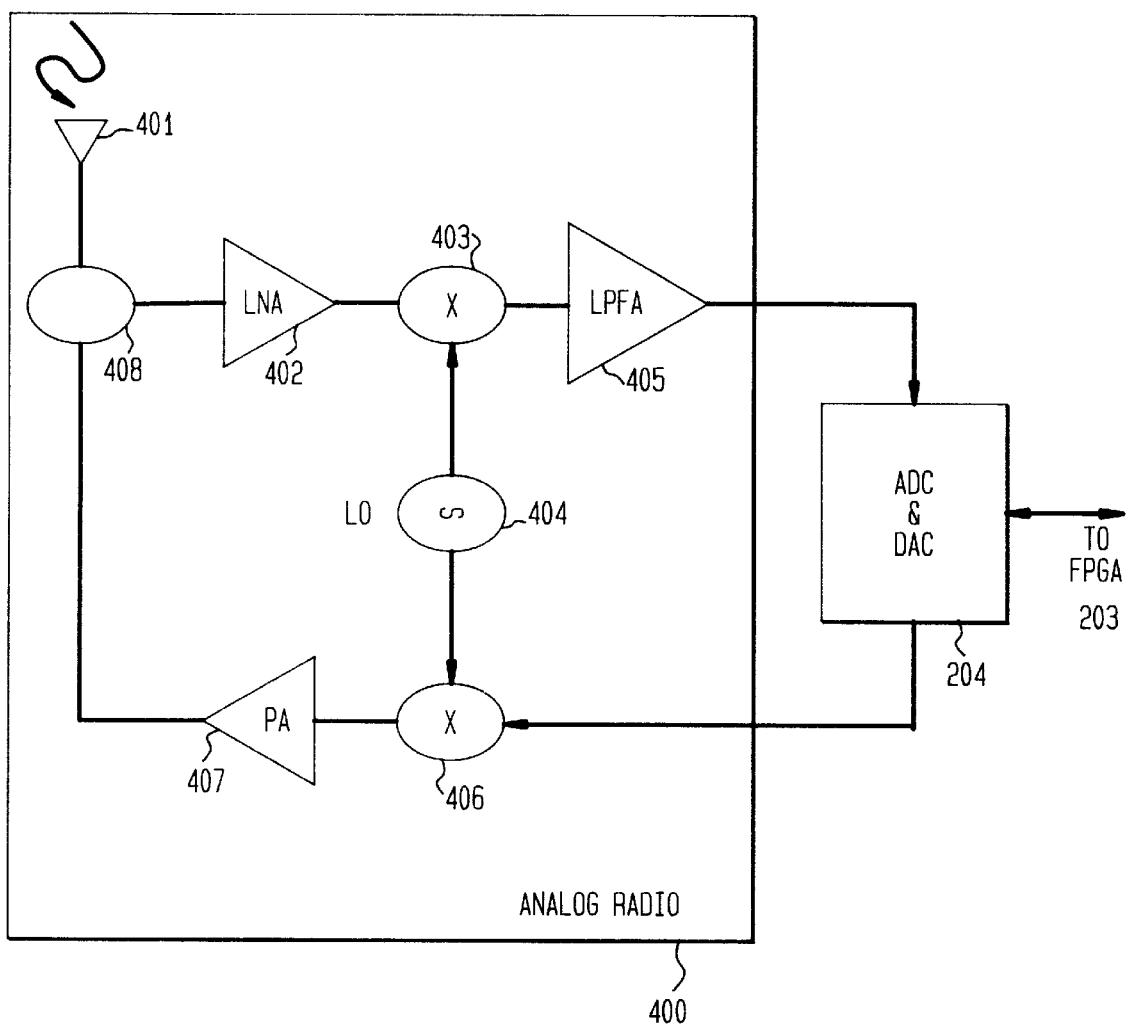
FIG. 5 shows an illustrative analog radio subsystem of a digital communications system.

In this embodiment, the Analog Radio 400 of FIG. 5 includes an Antenna 401, Low-Noise Amplifier (LNA) 402, Downlink Mixer 403, a Local Oscillator 404, a Low Pass Filter Amplifier (LPFA) 405, Uplink Mixer 406, Power Amplifier 407, and a Circulator/RF Switch 408. Single Radio Frequency (RF) IC chips are available that contain most or all of the functions in FIG. 5.

It should be noted that the Analog Radio 400 does not limit the Digital Communications System 100 implementation of FIG. 1. The RF amplifiers and mixers determine an RF communications band(s) of interest, e.g., the 2.4 GHz ISM vs. the 46/49 MHz cordless telephone band, but not the allowable channel bandwidth or channel access techniques, e.g., TDMA or CDMA. The LPFA 405 and ADC/DAC unit 204 determine the maximum IF frequency. The necessary filtering and digital down conversion algorithms are performed in the FPGA 203.

Figure 6:
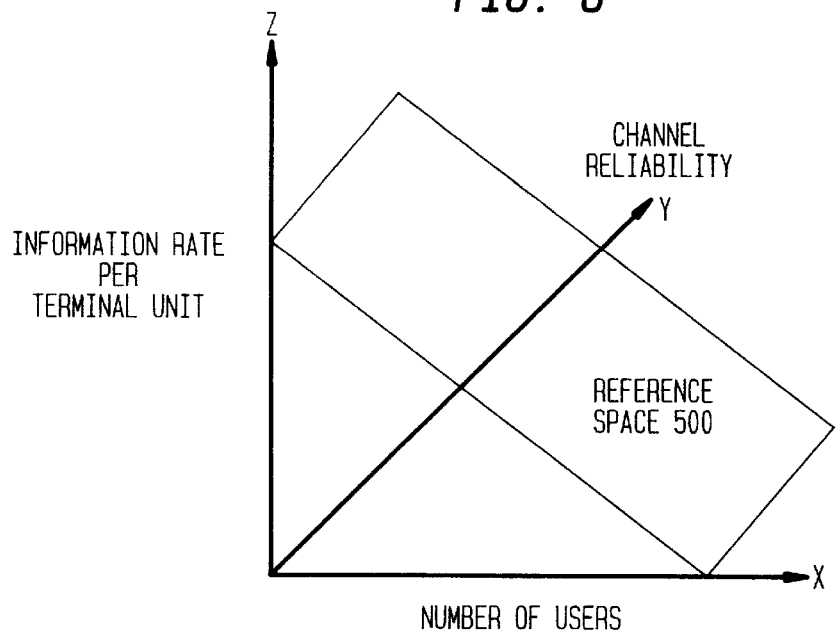
FIG. 6 is a graphic representation of a reconfiguration space of various parameters which the adaptive digital communications systems can monitor for reconfiguring the adaptive digital communications system.

FIG. 6 shows an illustrative feasible programming Reference Space 500 for a Digital Communications System 100 (FIG. 1) over a shared medium. If either the number of users increases or the channel reliability decreases the information rate available to a terminal unit decreases. Thus, three parameters—number of users, channel reliability, and information data rate from each terminal—combined determine the characteristics of the communications signal quality available to the terminal unit. Therefore, FIG. 6 represents a three-dimensional picture with the above three parameters as the x, y, and z axes respectively; and the Reference Space 500 is a three dimensional volume showing the feasible operating conditions. Thus, the shape and size of the Reference Space 500 will change depending on the configuration of each block in the Digital Communications System 100 FIG. 1. In the Receive Chain 124 (FIG. 1), the SPM&O 110 (FIG. 1) measures the performance of the Channel 105, Digital Demodulator 106, Channel Decoder 107, and Source Decoder 108 and calculates which, if any, of the blocks 102–104 and 106–108 should be reconfigured in order to increase the information throughput between the Terminal Units 112 and 114 (FIG. 2).

In this embodiment, if a change is necessary, the SPM&O 110 alerts the PC 201 (FIGS. 3 and 4), through the Programming Logic 202 (FIGS. 3 and 4), to reprogram the FPGA 203 (FIGS. 3 and 4) with the appropriate digital communications system configuration. Alternatively, the SPM&O 110 can provide the measurement information to the PC 201, and the PC 201 can determine if reprogramming is necessary and the appropriate digital communications configuration. In addition, a Message 111 (FIG. 1) is sent to the Transmit Chain 128 communicating with the Receive Chain 124, with the new configuration information. The fact that a reprogramming is occurring and the new configuration information can also be sent through the PC 201. The blocks 102–104 and 106–108 of the communicating Transmit Chain 128 and Receive Chain 124 (FIG. 1) are reprogrammed accordingly.

This reconfiguration can be executed on a dynamic basis. By dynamic in this particular embodiment means the following. Current technology allows reconfiguration of an entire FPGA 203 device in about 100 ms. In a typical radio communications protocol, time slots on the order of milliseconds in length are grouped together to form frames on the order of tens of milliseconds in length which are in turn grouped to form super frames which are on the order of fractions of a second. It would then be feasible for reconfigurations to take place on the time scale of super frames. Or, stated in another context, a transmission session consisting of a group of packets, requiring on the order of fractions of a second or more, could be the level of granularity under which such reconfigurations could take place. In this manner, such reconfigurations could take place on a dynamic basis given the results of the measurements taken in the SPM&O unit 110.

In this particular embodiment, the SPM&O unit 110 (FIG. 1) performs the following measurements:

The average signal-to-noise ratio (SNR) at the input of the Digital Demodulator 106.

The channel symbol error rate ($P_s$) at the output of the Channel De coder 107.

The BER at the output of the Source Decoder 108.

The instantaneous SNR (Eq. 1) is approximated b y the SPM&O 110. This measurement is accomplished by measuring the amount of background noise input to the Digital Demodulator 106 (FIG. 1) when no signals exist on the channel $\overline{n^2(t)}$, as compared to the signal power of the desired signal, $\overline{s^2(t)}$ (Eq. 1). The SPM&O 110 also measures the amount of background noise at other carrier frequencies, $\overline{n^2(t)}$; this measurement being carried out by digital filtering and processing of the output of the Channel 105. The Receive Chain 124 uses digital processing algorithms to channelize the frequency band and perform carrier selection. The $\overline{SNR}$ is a weighted average of the instantaneous SNR and the previous value of $\overline{SNR}$ (Eq. 2).

$$SNR = \overline{s^2(t)}/\overline{n^2(t)} = \sum_i s^2(i) \bigg/ \sum_i n^2(i) \quad i = 0, \ldots, N-1 \quad (1)$$

$$\overline{SNR} = a * \overline{SNR} + SNR \qquad 0 < a < 1 \quad (2)$$

The channel symbol error rate $P_s$ is determined by the number of channel symbol bits in error output from Channel Decoder 107 (FIG. 1) over a predetermined number of channel bits.

Figure 7:
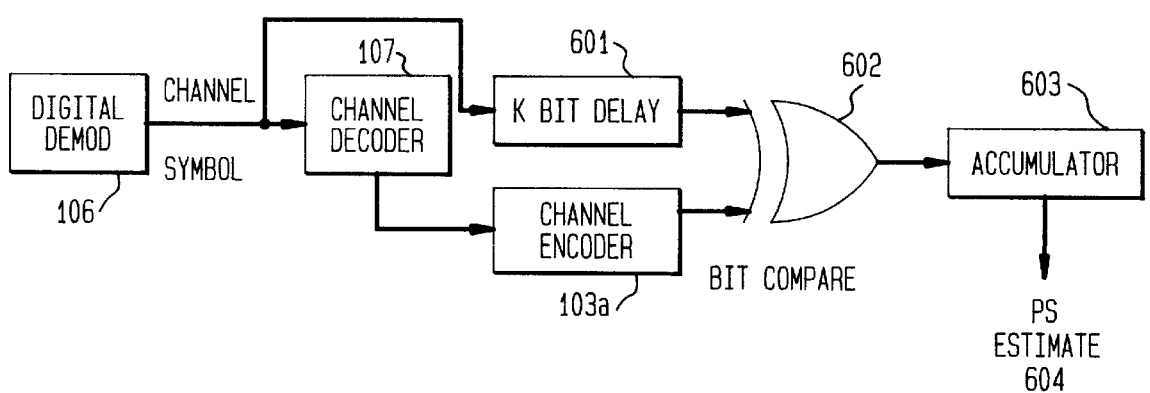
FIG. 7 shows a block diagram of an embodiment of a re-configure and compare unit used to calculate the channel symbol error rate.

In accordance with an aspect of certain embodiments of the present invention, FIG. 7 shows an embodiment of a Re-Encode and Compare Circuit for determining the channel symbol error rate. The Re-Encode and Compare Circuit is part of the SPM&O 110 (FIG. 1) in this particular embodiment. The output of the Digital Demodulator 106 is provided to both the Channel Decoder 107 and to a K-bit Delay register 601, where K is the bit delay through the Channel Decoder 107 and a Channel Encoder 103a. The output bits of the Channel Encoder 103a and the K bit delay register 601 are compared by an exclusive-or (XOR) gate 602 and accumulated by accumulator 603 over a number of bits M, thereby generating an estimate of the channel symbol error rate Ps.

The BER is estimated from the $P_s$ Estimate 604 and the CRC error check is performed by the Source Decoder 108. In this embodiment, the information bit error ($P_E$) is calculated by counting the number of bad CRC message checks ($P_M$) for a number of packets (W) and dividing by the number of bits per packet (N)

$$P_E = M_P/NW \qquad (3)$$

and the BER is calculated by taking the maximum of the information bit error rate and the channel symbol bit error rate multiplied by the number of bits per symbol (M).

$$BER = \text{Max}[P_E, M \cdot P_S] \qquad (4)$$

Other, more complicated measurements of the Channel 105 can be performed in the SPM&O 110, e.g., multipath delay spread and channel fading power attenuation, by adding the additional measurement algorithms.

In a particular example of the Digital Communications System 100 of FIG. 1, Transmit Chain 128 is communicating with Receive Chain 124 using 8-level quadrature amplitude modulation (QAM) with ½ rate convolutional channel encoding with a 1 Mb/s information bit rate. The SPM&O 110 for the Receive Chain 124 measures the SNR to be 9 dB, the channel symbol error rate $Ps = 2*10^{-2}$, and a $BER = 10^{-3}$. The SPM&O 110 also measures other carriers in the band and does not find a channel that will improve the SNR performance between the Transmit Chain 128 and the Receive Chain 124. The Receive Chain 124 notifies the Transmit Chain 128 to change its digital communications architecture to be Direct Sequence Spread Spectrum (DSSS), DQPSK modulations with no channel encoding and a 10 chip per bit, 32 bit, maximum length Pseudo-random Noise (PN) spreading code, with a 1 Mb/s information bit rate. The Receive Chain 124 then notifies the Programming Logic 202 (FIGS. 3 and 4) to reprogram the digital communications system architecture with the above parameters. The Programming Logic 202 (FIGS. 3 and 4) notifies the PC 201 (FIGS. 3 and 4), which retrieves and/or determines the firmware for the above system parameters, and reprograms the FPGA 203 (FIGS. 3 and 4). After reprogramming the FPGA 203 (FIGS. 3 and 4), the Transmit Chain 128 and the Receive Chain 124 continue their communications using the new digital communications system architecture until either the SPM&O 110 or the External Control 130 decide a new digital communications system architecture is needed to transfer information.

In this example, the choice of DSSS modulation was made by the SPM&O 110 located within the Receive Chain 124 since no free carriers, which would improve SNR performance, were available. Terminal Unit 114 assumed other users occupied these carriers. The reconfiguration of the architecture to a processing gain of 10 chips per bit, DQPSK modulation and no channel coding provided an SNR of 10 dB. However, for DQPSK, such a configuration provides an information $BER = 2*10^{-4}$ with the equivalent information bit rate of the previous system configuration between Terminal Unit 114 and Terminal Unit 112. Reconfiguring the digital communications system using other metrics or system parameters to increase channel utilization are possible without departing from the present invention.

In addition to the embodiments described above, alternative configurations of the adaptive digital communications system according to the principles of the present invention are possible which omit and/or add components and/or use variations or portions of the described system. For example, the SPM&O 110 has been described in connection with the Receive Chain 124, but all or part of an SPM&O 110 can also be in a separate location, such as a central control center or external control. Such an SPM&O 110 could receive the measurement data or system parameters from the unit(s), determine the appropriate configuration for the unit(s) and provide the respective reconfiguration information to the unit(s), thereby remotely reprogramming the unit(s).

We now disclose how a communications channel could be asymmetric from the standpoints of the Digital Communications System 100 architectures implemented in each direction. In one embodiment, Terminal Unit 112 is communicating with Terminal Unit 114 (FIG. 2) through Channel 105. Terminal Unit 112 receives a Reprogramming Message 112, either from its SMP&O 110, External Control 130, or from Terminal Unit 114 by way of the Information Sink 109 (FIG. 1). In this embodiment, Terminal Unit 112 only reprograms its Receiver Chain 124 and not its Transmit Chain 128; therefore, Terminal Unit 112 and Terminal Unit 114 continue their communication session but using different digital communication system architectures. For example, communications from Terminal Unit 112 to Terminal Unit 114 use QPSK digital modulation and communications from Terminal Unit 114 to Terminal Unit 112 are by FSK modulation. The use of asymmetric Transmit and Receive Chains (128 and 124 respectively) are useful in many applications (i.e., cargo tracking) and for non-reciprocal Channel 105 conditions (i.e., an obstruction close to only one of the Terminal Units 112 & 114). Given a specific application or Channel 105 state, any or all of the Transmit and Receive Chain (128 and 124 respectively) can be independently configured to best optimize the Digital Communications System 100.

For communications from a Transmit Chain 128 of a first transceiver to a Receive Chain 124 of a second transceiver, if a reconfiguration of the Receive Chain 124 of the second transceiver takes place, then the Transmit Chain 128 of the first transceiver is informed of this reconfiguration in order for communications to take place. It is expected that messages will be transmitted, using existing communications protocols, between the first and second transceivers to coordinate the reconfiguration of the Receive Chain 124 and the Transmit Chain 128 for both, or all, transceivers.

What has been described is merely illustrative of the application of the principles of the present invention. Other arrangements and methods can be implemented by those skilled in the art without departing from the spirit and scope of the present invention.

What is claimed is:

1. A method of receiving radio communication signals, said method comprising the steps of:

providing receive circuitry having an architecture fully implemented in at least one programmable logic device for receiving said radio communication signals; and reconfiguring all of said at least one programmable logic device to change said architecture of said receive circuitry, where said architecture change modifies at least one of the channel symbol rate, occupied bandwidth, modulation technique, or multiple access technique for said receive circuitry to receive said radio communication signals.

2. The method of claim 1 wherein said reconfiguring is implemented in a dynamic manner.

3. The method of claim 1 further including the step of:
measuring the signal quality of said radio communication signal, and where said architecture change of said receive circuitry is based upon the results of said signal quality measurement.

4. The method of claim 3 where said signal quality measurement consists at least of a measurement of the bit error rate.

5. The method of claim 3 where said signal quality measurement consists at least of a measurement of the signal-to-noise ratio.

6. The method of claim 3 where said signal quality measurement consists at least of a measurement of the channel symbol error rate.

7. The method of claim 1 further including the step of:
using at least one Programmable Logic Device connected to at least one Interconnection Integrated Circuit device.

8. The method of claim 1 further including the step of:
receiving configuration information from a source other than said radio communication signals; and
changing said architecture of said receive circuitry based upon said configuration information.

9. A method of transmitting radio communication signals, said method comprising the steps of:
providing transmit circuitry having an architecture fully implemented in at least one programmable logic device for transmitting said radio communications signals;
reconfiguring all of said at least one programmable logic device to change said architecture of said transmit circuitry, where said architecture change modifies at least one of the data rate, occupied bandwidth, modulation technique, or multiple access technique for transmitting of said radio communications signal.

10. A method of receiving radio communication signals over a radio communications channel, said method comprising the steps of:
receiving a radio communications signal using receive circuitry having a particular architecture implemented in at least one programmable logic device;
measuring at least one radio channel condition for said radio communications channel; and
reconfiguring said at least one programmable logic device to change said architecture of said receive circuitry, where said architecture change modifies at least one of the information data rate, occupied bandwidth, modulation technique, or multiple access technique for said radio communication channel, and where said reconfiguration is based upon at least the results of said radio channel condition measurement.

11. The method of claim 10 wherein said reconfiguring is implemented in a dynamic manner.

12. The method of claim 9 further including the step of:
measuring the signal quality of said radio communication signal, and where said architecture change of said transmit circuitry is based upon the results of said signal quality measurement.

13. The method of claim 12 wherein said signal quality measurement consists at least of a measurement of the bit error rate.

14. The method of claim 12 wherein said signal quality measurement consists at least of a measurement of the signal-to-noise ratio.

15. The method of claim 12 wherein said signal quality measurement consists at least of a measurement of the channel symbol error rate.

16. The method of claim 9 further including the step of:
using said at least one programmable logic device connected to at least one Interconnection Integrated Circuit device.

17. The method of claim 9 further including the step of:
receiving configuration information from a source other than said radio communication signals; and
changing said architecture of said transmit circuitry based upon said configuration information.

18. A radio transceiver comprising:
at least one programmable logic device configured to fully implement an architecture for said radio transceiver; and
a programming device configured to reconfigure all of said at least one programmable logic device to change said architecture of said transceiver, where said architecture change modifies at least one of the data rate, occupied bandwidth, modulation technique, or multiple access technique for said radio transceiver.

19. A method of transmitting a radio communication signals over a radio communications channel, said method comprising the steps of:
receiving a radio communications signal over said radio communications channel;
measuring at least one radio channel condition for said radio communications channel; and
reconfiguring at least one programmable logic device implementing an architecture for transmit circuitry to change said architecture of said transmit circuitry for transmitting radio communications signals over said radio communications channel, wherein said reconfiguration modifies at least one of the information data rate, occupied bandwidth, modulation technique, or multiple access technique for said radio communication channel and said reconfiguration is based upon at least the results of said radio channel condition measurement.

* * * * *